A. J. OLIVA AND A. SCAGLIONE.
APPARATUS FOR RENEWING CHOPPING BLOCKS.
APPLICATION FILED MAY 14, 1919.
1,321,240.
Patented Nov. 11, 1919.
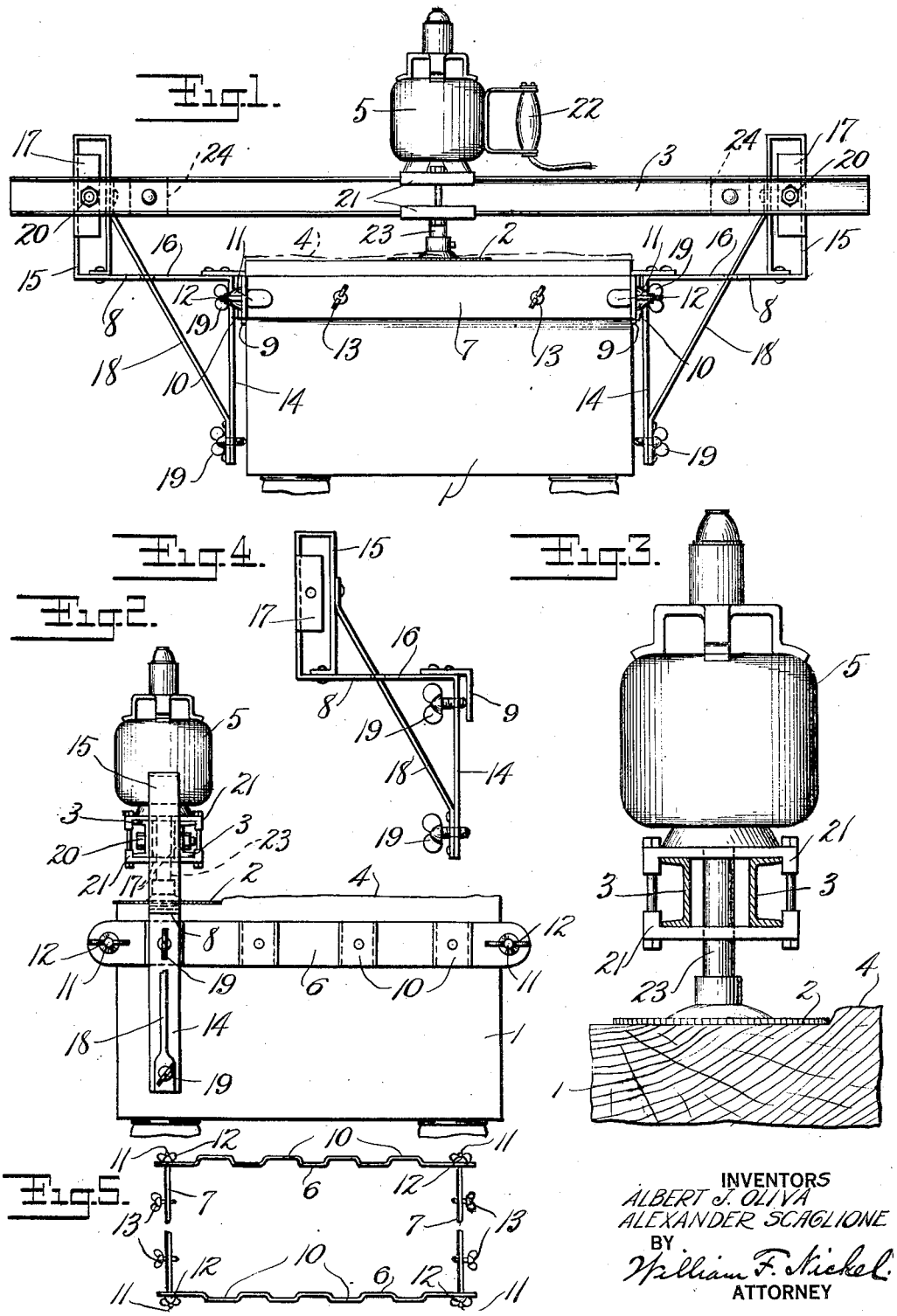
INVENTORS
ALBERT J. OLIVA
ALEXANDER SCAGLIONE
BY
William F. Nickel
ATTORNEY

UNITED STATES PATENT OFFICE.

ALBERT J. OLIVA AND ALEXANDER SCAGLIONE, OF NEW YORK, N. Y.

APPARATUS FOR RENEWING CHOPPING-BLOCKS.

1,321,240.  Specification of Letters Patent.  Patented Nov. 11, 1919.

Application filed May 14, 1919. Serial No. 296,982.

*To all whom it may concern:*

Be it known that we, ALBERT J. OLIVA and ALEXANDER SCAGLIONE, subjects of the King of Italy, residing in New York, in the counties of Bronx and New York and State of New York, have invented certain new and useful Improvements in Apparatus for Renewing Chopping-Blocks, of which the following is a specification.

Our invention relates to improvements in apparatus for renewing chopping blocks; particularly apparatus for renewing such blocks by trimming and restoring the upper surface of the same.

Experience has shown that chopping blocks in butcher stores and other places where meat is cut and sold invariably become worn and rough after a short period of use; because their upper faces are subjected to the blows of cleavers and other sharp implements, and because of the additional fact that the tops of such blocks must be regularly scraped to clean them. The implements mentioned will frequently inflict deep gashes; and the scraping, which is done my hand, gives a very uneven effect because some parts of the block will be relatively soft and the scraping tool may thus produce a number of marked projections and hollows.

Our object is to trim a chopping block by imparting a perfectly plane surface to the top of the same.

A further object of our invention is to provide apparatus by which a quickly acting cutting member can be movably mounted in such relation to a chopping block as to give the desired result; which will be simple, comprising but few parts, and capable of being manufactured at low cost; and which is of such design as to enable the trimming operation to be readily and efficiently performed.

The above and other objects and advantages of our invention are set forth in the following specification, taken in connection with the accompanying drawings; and the novel features of our invention are defined in the appended claims. This disclosure, however, is explanatory only; and we may alter the construction that is actually illustrated and described herein, without departing from the spirit and scope of our invention, to the full extent indicated by the general meanings of the terms in which the claims are expressed, and by variations in the phrasing of the same.

On the drawings:—

Figure 1 shows a chopping block in end elevation with apparatus according to our invention applied thereto;

Fig. 2 is a side view of what is shown in Fig. 1;

Fig. 3 is a detail showing how the trimming is accomplished:

Fig. 4 is view of part of our apparatus for mounting the cutting member; and

Fig. 5 is top plan of another part of our apparatus for enabling the cutting member to be maintained in the proper relation to a chopping block to be trimmed.

The same numerals identify the same parts throughout.

Referring particularly to the drawings we show a chopping block at 1, the same resting upon legs or posts indicated in Figs. 1 and 2; and the cutting member for renewing the top of this block is shown at 2. This cutting member may be a circular saw, for example, and it is so mounted that it can be moved by reason of rails or guideways 3, from one side of the block to the other.

In Fig. 1 the saw 2 is shown as if it were resting upon the upper face of the block 1 after the operation of renewing this block has been completed. The upper surface of the block as it appears after becoming worn and rough from constant use, is denoted by the numeral 4; this upper surface being indicated in Fig. 1 by means of a broken line. To actuate the cutting member 2 so as to trim the top of the block 1, we employ a motor 5, to the shaft to which the member 2 is affixed. This motor rests movably upon rails 3; and can be manipulated so as to be caused to pass from one end of the rails 3 to the other; and the rails 3 are held above the top of the block 1 by a suitable supporting means comprising a pair of bars 6 and another pair of bars 7. The bars 6 are parallel to each other and the bars 7 are also parallel to each other, and when the four bars are connected, as shown in Fig. 5, they constitute an adjustable frame which can be slipped upon the block 1 to encircle it near the top and be clamped fast thereto. The frame thus provided is adapted to carry a pair of brackets 8 one of which is placed at one side of the block and the other at the opposite side, and to these brackets the guides or rails 3 are secured at their ends at the required distance above the top 4.

To enable the brackets 8 to engage the frame comprising the bars 6 and 7, we attach to each of the brackets 8 a down-turned projection or hook 9 which is intended to be inserted between the bars 6 and sides of the block 1. For this purpose the bars 5 may be so shaped as to provide bent portions 10 making recesses or pockets into which the hooks 9 can be dropped. Obviously the portions 10 will be spaced just far enough from the sides of the block 1 as the thickness of the hooks 9 in order to give a snug fit. Both the bars 6 will be provided with the bent portions 10 just mentioned; these bent portions being in sufficient number and being spaced apart a sufficient distance to enable the block to be trimmed bit by bit until the entire upper surface has been renewed. For example, if the bars 6 are disposed so as to engage the front and back of the block and the bars 7 the ends of same, the brackets 8 will first be located so as to engage the portions 10 of the bars 6 as far to the left as possible. (Fig. 2). The saw 2 will then be set in rotation and the top will be trimmed from front to back over a section as wide as the size of the saw will permit. The saw is then stopped, and the brackets, guides, and motor lifted and moved to bring the brackets into position to engage the nearest bent portion 10 to the right on Fig. 2. Then the saw can be started again and caused to trim another portion of the top of the block as before; starting from the front edge and passing through the rear. As indicated in Fig. 1 there will be sufficient space provided by the dimensions of the brackets 8 to give the required clearance to the saw 2 at the front of the block; for example, to enable the saw to be drawn out along the guides or rails 3 far enough to permit its forward edge to begin cutting into the front of the block just below the top 4 and thus allow each successive portion of the block to be trimmed quickly and thoroughly from the front to the back of the same.

The bars 7 at the ends and sides of the block will be provided with threaded projections 11 adapted to extend through holes in the ends of the bars 6. These projections 11 will be engaged by wing nuts 12 to secure the ends of the bars 6 and 7; further the bars 7 may be provided with binding screws 13 extending through threaded holes in these bars and acting, when turned up, to engage the faces of the block 1 at the ends thereof and prevent the frame from slipping. To apply the frame consisting of the bars 6 and 7 one need only adjust it by turning the nuts 12 to get the frame slightly larger than the periphery of the block. Then the operator can slip it over the top, turn up the nuts 12 to tighten it and then manipulate the nuts 13 to secure it finally in position; he can then apply the brackets supporting the rails or guides 3 with the motor, and the apparatus is ready for use.

The brackets 8 can easily be made by bending them into the required shape. As shown in Fig. 4 they have the form of a double angle iron which, when properly mounted, comprises a downward extending arm 14, and an upward extending arm 15, the two arms being connected by a horizontal arm 16. To the arm 16 the projection 9 is secured by riveting; this projection extending beyond the arm 14 and being bent downward parallel therewith, and spaced from the arm 14 far enough to permit the thickness of the bars 6 to pass between this projection and this arm. The other arm 15 is bent back upon itself and has its lower end riveted to arm 16, and it carries two bearing lugs 17; which are disposed at opposite sides, with perforations for bolts which carry the weight of the guides or rails 3. To stiffen the bracket we may provide the brace 18 connecting the arms 14 and 15, this brace passing through a hole in the arm 16 if desired. To make sure that the brackets 8 will be mounted in rigid relation with the block 1, we also provide these brackets with binding screws 19 carried by the downward extending arms 14, one of these screws being adapted to engage the bar 6 carrying the bracket and the other to engage the side of the block 1 below the bar 6. When these screws are tightened the brackets are made fast to the bars 6 and any possibility of looseness or movement with respect to the block 1 is eliminated.

As stated each of the arms 15 of the brackets 8 is provided with a pair of lugs 17 and the rails or guides 3 are secured by means of bolts and nuts 20 which pass through the lugs and the rails or guides. The rails or guides are in the form of channel irons and on the top of these rails is a sliding seat 21 to which the motor is attached. This seat has the form of a plate with down-turned edges, and it is bolted to a similar plate with up-turned edges engaging the lower edges of the guides or rails 3. The two plates thus constitute a cross-head by which the motor 5 is carried. The frame of the motor has a handle 22 to enable it to be drawn back and forth and to this handle the electrical conductors for supplying the windings of the motor with electric current can be led; a switch mounted on this handle controlling the circuit so as to connect the motor to the supply lines or disconnect it at will. The shaft of the motor extends downward between the guides or rails 3 through openings in the plates 20 and these openings may be lined to provide suitable bearings for the motor shaft so that the same can revolve and rotate the saw 2 secured to the lower end of the shaft 23. Stops 24 can be secured to the rails or guides 3 between same and adjacent to brackets 8 to limit the movement of the motor and of the saw in either direction.

From the foregoing the mode of utilizing our invention will be clear. When a chopping block is to be trimmed on top, the saw 2 is caused to cut off successive portions and the brackets 8 are moved from one side toward the other side of the block 1 by making the hooks 9 engage the bent portions 10 of the bars 6 in succession, so that the saw can operate properly and make one cut after the other from the front of the block to the back until the trimming operation is completed. The motor 5 carrying the saw 2 can be caused to begin cutting from the front of the block. In such case the motor at the beginning of the travel thereof along the guides or rails 3 must be drawn far enough forward toward the bracket 8 to enable it to clear the block so that the forward edge of the saw can engage the front of the block as the motor starts on its travel toward the opposite bracket; or the saw 2 can have such a diameter and the portions 10 of the bars 6 be spaced at such a distance that the motor need not be drawn far enough toward the front bracket to cause the saw to clear the front of the block 1 at all, but may make each successive cut by starting from a position in which the shaft 23 of the motor will be just beyond the front face at the start with the saw 2 slightly overlapping the top of the block 1. In the latter case the portions 10 of the bars 6 must be closer together than the length of the radius of the saw 2.

Of course any kind of a cutting member instead of a saw can be utilized. For instance we may attach a milling device consisting of a number of rotating blades to the shaft of the motor instead of a saw; and in place of an electrical motor almost any suitable means to rotate the shaft 23 may be employed, such as gearing operated by a handle for instance. Further the portions 10 instead of being integral with the bars 6 may be separate pieces attached to same by riveting or welding. If separate pieces instead of portions 10 are employed, the projections or hooks 9 will fill the spaces between these pieces and the bars 6 instead of passing between the bars and sides of the block 1 as described.

The rails or guides 3, being secured by the bolts and nuts 20, can be handled as if pivoted at either end, merely by removing the bolt and nut at the opposite end. Hence the motor and the cutting member can be raised and lowered at will.

In practice, parts of the top of the block 1 break off as the saw advances and thus the cutting and trimming operation can proceed without interruption. Ordinarily, the quickest way of working either apparatus is to proceed so that the edge of the saw 2 overlaps the front edge of the block 1 at the beginning of its travel across the top 4, instead of from a position in which the saw 2 clears the block 1 entirely; although if manipulated in this way, the apparatus will work just as well because as the motor and saw advance, parts of the top of the block 1 will chip and break off as already stated. The brackets 8 are shown as being of the same size although the bracket 8 of the back can have its horizontal arm 16 much shorter, because the saw does not have to travel past the back of the block 1.

Having described our invention what we claim as new and desire to secure and protect by Letters Patent of the United States is:

1. Apparatus for renewing chopping blocks comprising opposing bars having portions making recesses, bars engaging the ends of said opposing bars for adjustably uniting the latter, all of said bars constituting a frame to encircle said block, and binding screws carried by said frame to engage said block.

2. Apparatus for renewing chopping blocks comprising a bracket having oppositely extending arms and a portion connecting same, one of said arms having a pair of bearings, and a hook secured to the connecting portion and extending in the same direction as the other arm and substantially parallel thereto.

3. Apparatus for renewing chopping blocks comprising a bracket having oppositely extending arms and a portion connecting same, one of said arms having a pair of bearings, a hook secured to the connecting portion and extending in the same direction as the other arm and substantially parallel thereto, and a brace for said arms passing through said connecting portion, 4. Apparatus for renewing chopping blocks comprising a bracket having oppositely extending arms and a portion connecting same, one of said arms being returned upon itself with its end secured to said portion and having perforated lugs side by side providing bearings, a hook secured to the connecting portion extending in the direction of the other arm and substantially parallel thereto, and a brace for said arms passing through the connecting portion.

5. Apparatus for renewing chopping blocks comprising bars to be united and encircle said block, some of said bars having portions making recesses, brackets having projections to engage said recesses successively, said brackets having upward extending arms with bearing lugs thereon, parallel guides or rails bolted to said lugs and extending across said block above the top of same, a cross-head engaging said guides or rails, a motor attached to said cross-heads, the shaft of said motor extending downward between said guides or rails, and a cutting member secured to said shaft below the guides or rails to trim the top of said block and thus renew the upper surface of same.

In testimony whereof, we have signed our names to this specification this 24th day of April, 1919.

A. J. OLIVA.
A. SCAGLIONE.